US009432865B1

(12) United States Patent
Jadunandan et al.

(10) Patent No.: US 9,432,865 B1
(45) Date of Patent: Aug. 30, 2016

(54) WIRELESS CELL TOWER PERFORMANCE ANALYSIS SYSTEM AND METHOD

(71) Applicant: Sprint Communications Company L.P., Overland Park, KS (US)

(72) Inventors: Kevin Jadunandan, Palm Bay, FL (US); Shane A. Lobo, Elkton, FL (US); Drew A. Shinholster, Jr., Maitland, FL (US); Jeff Stamborski, Casselberry, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 4 days.

(21) Appl. No.: 14/135,574

(22) Filed: Dec. 19, 2013

(51) Int. Cl.
*H04W 24/08* (2009.01)
*H04W 4/14* (2009.01)
*H04W 88/08* (2009.01)

(52) U.S. Cl.
CPC ............... *H04W 24/08* (2013.01); *H04W 4/14* (2013.01); *H04W 88/08* (2013.01)

(58) Field of Classification Search
CPC ....... H04W 4/02; H04W 4/00; H04W 92/02; H04W 24/08; H04W 24/00; H04W 16/18; H04W 88/08; H04W 24/02; H04W 16/10; H04W 88/085; H04M 2207/18; H04L 12/2697; H04B 17/0042
See application file for complete search history.

(56) References Cited

U.S. PATENT DOCUMENTS

| | | |
|---|---|---|
| 5,914,668 A | 6/1999 | Chavez, Jr. et al. |
| 5,987,099 A | 11/1999 | O'Neill et al. |
| 6,115,610 A | 9/2000 | Goetz et al. |
| 6,216,002 B1 | 4/2001 | Holmring |
| 6,539,221 B1 | 3/2003 | Vasudevan et al. |
| 6,587,686 B1 | 7/2003 | Cuffaro et al. |
| 6,745,011 B1 | 6/2004 | Hendrickson et al. |
| 6,842,620 B2 | 1/2005 | Smith et al. |
| 7,236,767 B1* | 6/2007 | Cankaya et al. ............... 455/405 |
| 7,237,767 B2 | 7/2007 | Sakakibara et al. |
| 7,454,002 B1 | 11/2008 | Gardner et al. |
| 7,693,042 B1 | 4/2010 | Wei |
| 7,778,591 B1 | 8/2010 | Van Hoff et al. |
| 7,903,625 B1 | 3/2011 | Srinivas et al. |

(Continued)

OTHER PUBLICATIONS

Jadunandan, Kevin, et al., Patent Application entitled "Wireless Network Performance Analysis System and Method", filed Sep. 7, 2012, U.S. Appl. No. 13/607,485.

(Continued)

*Primary Examiner* — George Eng
*Assistant Examiner* — Umair Ahsan (57) ABSTRACT

A system for managing a cellular wireless communication network in near real time is disclosed. The system comprises a data store storing performance metrics in near real time and segmented according to base transceiver stations and record time. The system also comprises a computer and an application that receives a selection of a geographic area and a time period and identifies a predetermined quantity of base transceiver stations nearest the geographic area. The application also retrieves metrics associated with each of the identified base transceiver during the time period from the data store and retrieves the metrics most recently recorded for each identified base transceiver station. The application analyzes the metrics associated with each base transceiver station and compares the metrics associated with each base transceiver station with the most recently recorded metrics in order to identify that a value of a metric of a base transceiver station is outside a range.

20 Claims, 4 Drawing Sheets

(56) References Cited

U.S. PATENT DOCUMENTS

| | | |
|---|---|---|
| 8,005,644 B1 | 8/2011 | Evans et al. |
| 8,145,186 B1 * | 3/2012 | Vaughan ............. 455/405 |
| 8,145,560 B2 | 3/2012 | Kulkarni et al. |
| 8,170,547 B1 * | 5/2012 | Bhan et al. ............. 455/424 |
| 8,229,415 B1 | 7/2012 | Chen et al. |
| 8,423,035 B1 | 4/2013 | Dinan et al. |
| 8,570,955 B2 | 10/2013 | Viorel et al. |
| 8,600,384 B1 | 12/2013 | Moreno et al. |
| 8,627,125 B2 | 1/2014 | Kashyap |
| 8,825,759 B1 | 9/2014 | Jackson et al. |
| 8,880,600 B2 | 11/2014 | Lento et al. |
| 8,966,055 B2 * | 2/2015 | Mittal et al. ............. 709/224 |
| 9,210,600 B1 | 12/2015 | Jadunandan et al. |
| 2001/0036825 A1 | 11/2001 | Martin |
| 2002/0068559 A1 | 6/2002 | Sharma et al. |
| 2002/0069037 A1 * | 6/2002 | Hendrickson et al. ....... 702/186 |
| 2002/0177448 A1 | 11/2002 | Moran et al. |
| 2003/0078055 A1 | 4/2003 | Smith et al. |
| 2003/0100317 A1 * | 5/2003 | Kaplan et al. ............. 455/456 |
| 2003/0161265 A1 | 8/2003 | Cao et al. |
| 2004/0127224 A1 | 7/2004 | Furukawa et al. |
| 2005/0014492 A1 | 1/2005 | Kang et al. |
| 2005/0064820 A1 | 3/2005 | Park et al. |
| 2005/0096842 A1 | 5/2005 | Tashiro |
| 2005/0192001 A1 | 9/2005 | Samuel |
| 2006/0183471 A1 | 8/2006 | Samuel et al. |
| 2006/0217116 A1 | 9/2006 | Cassett et al. |
| 2007/0004394 A1 | 1/2007 | Chu et al. |
| 2007/0026886 A1 | 2/2007 | Vincent |
| 2007/0105583 A1 | 5/2007 | Gerlach |
| 2007/0288480 A1 | 12/2007 | Caplan et al. |
| 2008/0045245 A1 | 2/2008 | Billmaier et al. |
| 2008/0152104 A1 | 6/2008 | Keeler et al. |
| 2008/0207221 A1 | 8/2008 | Chari |
| 2008/0215355 A1 | 9/2008 | Herring et al. |
| 2008/0219365 A1 | 9/2008 | Viorel et al. |
| 2008/0233936 A1 | 9/2008 | Rajan et al. |
| 2009/0054056 A1 | 2/2009 | Gil |
| 2009/0055719 A1 | 2/2009 | Cossins et al. |
| 2009/0075648 A1 | 3/2009 | Reed et al. |
| 2009/0111462 A1 | 4/2009 | Krinsky et al. |
| 2009/0161850 A1 | 6/2009 | Raymer et al. |
| 2009/0164551 A1 | 6/2009 | Oesterling et al. |
| 2009/0248711 A1 | 10/2009 | Martinez et al. |
| 2009/0275335 A1 | 11/2009 | Jalloul et al. |
| 2009/0286526 A1 | 11/2009 | Matsunaga |
| 2009/0296674 A1 | 12/2009 | Ekl et al. |
| 2010/0015926 A1 | 1/2010 | Luff |
| 2010/0099405 A1 | 4/2010 | Brisebois et al. |
| 2010/0151920 A1 | 6/2010 | Song et al. |
| 2010/0234031 A1 | 9/2010 | Lidron |
| 2011/0143748 A1 | 6/2011 | Shah et al. |
| 2011/0166986 A1 | 7/2011 | Graham et al. |
| 2011/0201317 A1 | 8/2011 | Karandikar et al. |
| 2011/0275364 A1 | 11/2011 | Austin et al. |
| 2011/0313695 A1 | 12/2011 | Houston et al. |
| 2011/0320588 A1 | 12/2011 | Raleigh |
| 2012/0058759 A1 | 3/2012 | Lundborg et al. |
| 2012/0096065 A1 | 4/2012 | Suit et al. |
| 2012/0120078 A1 | 5/2012 | Hubbard |
| 2012/0295618 A1 | 11/2012 | Ahmavaara et al. |
| 2013/0052019 A1 | 2/2013 | Ions et al. |
| 2013/0053019 A1 | 2/2013 | Schilling |
| 2013/0072222 A1 | 3/2013 | Weill et al. |
| 2013/0091452 A1 | 4/2013 | Sorden et al. |
| 2013/0157652 A1 | 6/2013 | Khaitan et al. |
| 2013/0331082 A1 | 12/2013 | Topaltzas et al. |
| 2013/0331114 A1 | 12/2013 | Gormley et al. |
| 2014/0003389 A1 | 1/2014 | Wang et al. |
| 2014/0022918 A1 | 1/2014 | Guo et al. |
| 2014/0078992 A1 | 3/2014 | Khandekar et al. |
| 2014/0177430 A1 | 6/2014 | Hassett |

OTHER PUBLICATIONS

Ford, Justin L. et al., Patent Application entitled "System and Method for Evaluating Operational Integrity of a Radio Access Network", filed Jan. 30, 2014, U.S. Appl. No. 14/169,046.
FAIPP Pre-Interview Communication dated Mar. 25, 2014, U.S. Appl. No. 13/607,485, filed Sep. 7, 2012.
FAIPP Office Action dated Sep. 5, 2014, U.S. Appl. No. 13/607,485, filed Sep. 7, 2012.
Final Office Action dated Jan. 21, 2015, U.S. Appl. No. 13/607,485, filed Sep. 7, 2012.
Office Action dated Apr. 8, 2015, U.S. Appl. No. 14/169,046, filed Jan. 30, 2014.
Notice of Allowance dated Jul. 24, 2015, U.S. Appl. No. 13/607,485, filed Sep. 7, 2012.
Final Office Action dated Sep. 25, 2015, U.S. Appl. No. 14/169,046, filed Jan. 30, 2014.
Advisory Action dated Dec. 10, 2015, U.S. Appl. No. 14/169,046, filed Jan. 30, 2014.
Office Action dated Feb. 4, 2016, U.S. Appl. No. 14/169,046, filed Jan. 30, 2014.

* cited by examiner

WIRELESS CELL TOWER PERFORMANCE ANALYSIS SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cellular wireless communication networks provide nearly ubiquitous connectivity for mobile devices such as mobile phones, personal digital assistants, and wireless enabled laptop computers. To provide radio links to mobile devices, cellular network operators build and maintain a large number of cell towers or cell sites. For example, a large wireless network providing national coverage may comprise more than 50,000 cell sites. The quality of cellular communication service provided by cell sites depends on a number of different factors such as the number of subscribers in a coverage area of the cell site, the radio signal strength of the cell site, and the local environment including foliage. Because these factors change over time as seasons change and as population distributions change, it is a challenge for cellular network operators to evaluate the performance of their network and the quality of service provided to their customers.

SUMMARY

In an embodiment, a system for managing a cellular wireless communication network in near real time is disclosed. The system comprises a cellular wireless communication performance data store, wherein the data store comprises cellular wireless communication performance metrics, wherein the performance metrics are segmented according to base transceiver stations and the time the performance metrics were recorded, and wherein the performance metrics are stored in the data store in near real time. The system also comprises a computer and an application that is stored in a non-transitory memory of the computer. When executed by the computer, the application receives a selection of a geographic area, receives a time period selection, wherein the time period selection comprises a time period before a most recent set of metrics were stored in the data store. The application also identifies a predetermined quantity of base transceiver stations nearest the geographic area. The application retrieves metrics associated with each base transceiver station of the predetermined quantity of base transceiver stations during the time period from the cellular wireless communication performance data store, retrieves in near real time metrics associated with each base transceiver station of the predetermined quantity of base transceiver stations, wherein the in near real time metrics comprise the metrics most recently recorded, and analyzes the metrics associated with each base transceiver station of the predetermined quantity of base transceiver stations during the time period. The application further compares the metrics associated with each base transceiver station of the predetermined quantity of base transceiver stations during the time period with the in near real time metrics, identifies that a value of at least one metric of at least one base transceiver station of the predetermined quantity of base transceiver stations is outside a range, wherein the range is based on the at least one metric of at least one base transceiver station of the predetermined quantity of base transceiver stations during the time period, builds a presentation identifying the value of the at least one metric, the metrics associated with each base transceiver station of the predetermined quantity of base transceiver stations during the time period, and the in near real time metrics, and transmits the presentation, whereby a user may view the presentation in a display.

In an embodiment, a method of managing a cellular wireless communication network in near real time is disclosed. The method comprises receiving, by an application, a selection of a geographic area, receiving, by the application, a time period selection, wherein the time period selection comprises a time period before a most recent set of metrics were stored in a data store, identifying, by the application, a predetermined quantity of base transceiver stations nearest the geographic area. The method further comprises retrieving, by the application, metrics associated with each base transceiver station of the predetermined quantity of base transceiver stations during the time period from the data store, retrieving, by the application, in near real time metrics associated with each base transceiver station of the predetermined quantity of base transceiver stations, wherein the in near real time metrics comprise the metrics most recently recorded, and analyzing, by the application, the metrics associated with each base transceiver station of the predetermined quantity of base transceiver stations during the time period. The method also comprises comparing, by the application, the metrics associated with each base transceiver station of the predetermined quantity of base transceiver stations during the time period with the in near real time metrics, identifying, by the application, that a value of at least one metric of at least one base transceiver station of the predetermined quantity of base transceiver stations is outside a range, wherein the range is based on the at least one metric of at least one base transceiver station of the predetermined quantity of base transceiver stations during the time period, building, by the application, a presentation identifying the value of the at least one metric, the metrics associated with each base transceiver station of the predetermined quantity of base transceiver stations during the time period, and the in near real time metrics, and transmitting, by the application, the presentation, whereby a customer care agent may view the presentation in a display and provide assistance to a wireless communication service subscriber based on the presentation.

In an embodiment, a system for managing a cellular wireless communication network in near real time is disclosed. The system comprises a cellular wireless communication performance data store, wherein the data store comprises cellular wireless communication performance metrics, wherein the performance metrics are segmented according to base transceiver stations and the time the performance metrics were recorded, and wherein the performance metrics are stored in the data store in near real time. The system also comprises a computer and an application that is stored in a non-transitory memory of the computer. When executed by the computer, the application receives a selection of a geographic area, receives a time period selection, wherein the time period selection comprise a time period before a most recent set of metrics were stored in the data store. The application also identifies a predetermined quantity of base transceiver stations nearest the geographic area. The application retrieves metrics associated with each base transceiver station of the predetermined quantity of base transceiver stations during the time period from the cellular wireless communication performance data store, retrieves in near real time metrics associated with each base transceiver station of the predetermined quantity of base transceiver stations, wherein the in near real time metrics comprise the metrics most recently recorded, and analyzes the metrics associated with each base transceiver station of the predetermined quantity of base transceiver stations during the time period. The application further compares the metrics associated with each base transceiver station of the predetermined quantity of base transceiver stations during the time period with the in near real time metrics, identifies that a value of at least one metric of at least one base transceiver station of the predetermined quantity of base transceiver stations is outside a range, wherein the range is based on the at least one metric of at least one base transceiver station of the predetermined quantity of base transceiver stations during the time period, builds a presentation identifying the value of the at least one metric, the metrics associated with each base transceiver station of the predetermined quantity of base transceiver stations during the time period, and the in near real time metrics, and transmits the presentation, whereby a user may view the presentation in a display. The application receives a viewing selection to view at least one metrics value associated with at least one base transceiver station of the predetermined quantity of base transceiver stations of a selection time within the time period and updates the presentation to display the at least one metrics value.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for presenting cellular communication network performance metrics in near real time and for analyzing a plurality of base transceiver stations of the cellular communication network nearest a geographic area based on a history of those base transceiver stations is taught herein. The system may take and record performance data out of isolated, possibly obscure or siloed locations and promote sharing and presenting the data in a useful format among a large number of wireless service provider employees. The information may be used by customer care agents or by customer service representatives to answer a customer question in real-time and/or in near real time and to communicate effectively with the customer about their wireless communication experience. In an embodiment, the information may be provided to the customer care agent at least in part in the form of talking points. The information may promote the customer care agent being able to tell the customer what their communication experience will be on the day of his or her call and predict what the customer's communication experience will be tomorrow and the next day. The system may promote a market manager determining at a glance how a particular geographic area of the cellular communication network is performing and/or will perform relative to the past performance of the cellular communication network at the same and/or a nearby geographic location.

The system promotes receiving a selection of a geographic area and/or geographic location and identifying cell sites (e.g. base transceiver stations, cellular wireless communication network towers, and/or the like) nearest the geographic location. It should be understood that identifying cell sites nearest the geographic area and/or geographic location may comprise cell sites located within the geographic area and/or the geographic location. The system may identify at least one cell site nearest to the geographic area and/or geographic location. The system may identify a plurality of cell sites, for example 6 cell sites, nearest the geographic area and/or geographic location.

The system may receive a time period selection and retrieve metrics stored in a data store and associated with each of the plurality of cell sites within the time period specified by the time period selection. This may support looking at performance metrics of a plurality of cell sites from the same selected time period, for example a time 4 days ago when a performance degradation was experienced by several users or when a greater than normal volume of calls to customer care was experienced. The data store may collect metrics from all cell sites of the cellular wireless communication network to store performance metric histories for every cell site. The system may also retrieve in near real time metrics associated with each of the plurality of cell sites and compare the performance metric history within the specified time period with the in near real time metrics for each cell site of the plurality of cell sites. In an embodiment, in near real time metrics may comprise the most recently recorded metrics.

The system may identify that a value of at least one metric and/or in near real time metric is outside a range and/or above or below a threshold. For example, the system may have analyzed the metrics retrieved from the data store to calculate a range of normal performance. Thus, if a value of a metric and/or near real time metric is outside the range and/or above or below a threshold, the value may indicate that a cell site is performing abnormally. The system may build a presentation to identify and/or display the value, the metrics of the plurality of cell sites during the time period, and the in near real time metrics and transmit the presentation to a display so that a user may view the presentation. The user may further take an action based on the presentation, for example assigning or opening a trouble ticket on at least one base transceiver station, allocating a budget for repairing at least one base transceiver station, or assigning a technician to adjust at least one base transceiver station.

The performance of a cell site, for example a base transceiver station (BTS), may be characterized using metrics such as a rate of dropped calls, a rate of blocked calls, a rate of evolution data only (EV-DO) failure, a rate of EV-DO dropped calls, a number of network trouble tickets, a number of network fault alarms, a number of calls to customer care per 1000 subscribers, a number of trouble tickets, and other performance indicators. In an embodiment, the network trouble tickets and/or network fault alarms may be stored and/or represented as a rate, for example a number of network trouble tickets per 1000 subscribers and/or a number of network fault alarms per 1000 subscribers. More generally, blocked call metrics may be referred to as voice call block metrics and dropped call metrics may be referred to as voice call drop metrics. Generalizing, metrics may comprise data call set-up fail metrics, which may comprise EV-DO failure metrics, as well as data call drop metrics, which may comprise EV-DO drop metrics. Each of these metrics may be recorded and displayed in a presentation individually. Alternatively, and/or additionally, the performance metrics for a cell site may be determined for each of a plurality of radio sectors of the cell site, for example for each of three different sectors. A cell site summary metric may be calculated as a weighted sum of the several individual metrics and/or of the several individual metrics of each of the different sectors of the cell site. For example, each metric may be multiplied by a predefined weighting factor or weighting coefficient and these products summed to determine the cell site summary metric. Alternatively, some other way of determining the cell site summary metric may be employed. In an embodiment, the cell site summary metric may be constrained to a defined range of values, for example from 0 to 1, from 0 to 10, from 1 to 10, or some other range of values. The cell site summary metric may take any valid value in the range of values, either integer values or non-integer values.

A location performance metric may be calculated based on performance metrics of a plurality of cell sites located within the geographic area and/or geographic location. The location performance metric may be determined as the sum of each of the cell site performance metrics divided by the number of cell sites located within the geographic area and/or geographic location, for example an average value of the cell site performance metrics. Alternatively, the location performance metric may be determined as the mean of each of the cell site performance metrics. In an embodiment, cell site metrics and/or in near real time metrics that are deemed unrepresentative of the location may be excluded from the determination of the location performance metric. For example, cell site metrics and/or in near real time metrics that are deemed to have outlier values may be excluded. As another example, cell site metrics and/or in near real time metrics associated with a cell site that has only recently been commissioned and may not yet be calibrated or adjusted may be excluded from the determination of the range. As another example, cell site metrics and/or near real time metrics associated with a cell site that experiences a very low volume of voice calls or data calls, for example a cell site in a remote rural area that only handles one voice call per day or ten voice calls per day, may be excluded from the determination of the range. The metrics and/or in near real time metrics may comprise additional performance related information, for example customer care calls per one thousand subscribers, a number of trouble tickets per one thousand subscribers, or other performance related information.

The performance metrics of individual cell sites, the performance metrics of cell sites, and the performance metrics of locations may be determined periodically, for example daily, weekly, on some other periodic interval, and/or in near real time. The performance metrics may be displayed and compared in a variety of ways. Individual performance in near real time metrics of a specific cell site may be compared with individual performance metrics of the same specific cell site. In an embodiment, in near real time metrics may comprise the most recently recorded metrics while other metrics such as performance metrics and/or individual performance metrics may comprise metrics recorded before the in near real time metrics were recorded. Performance metrics and/or in near real time metrics of one or more cell sites near a geographic area and/or a geographic location may be compared with the performance metrics and/or in near real time metrics of other cell sites near the geographic area and/or geographic location. Performance metrics and/or in near real time metrics may be compared with a history of performance metrics over a predetermined time period at a location in which the one or more cell sites are located.

The performance metrics of a selection of cell sites may be averaged, and the averaged metrics of the selection of cell sites may be compared to the averaged performance metrics of a location. The metrics being compared may be presented as two dimensional plot of metrics versus time, to promote appreciating how the metrics may change over time. Events that may impact performance, for example a professional sports event, may be displayed with the plot of metrics and may cast light on why performance metrics experienced a transient but significant degradation. Other information may likewise be presented aligned to the same time line, for example weather event information, upgrade information, and other information. Trouble tickets that are relevant, for example a trouble ticket opened against one of the cell sites, may be presented at the same time, thereby allowing the user to take into consideration the information associated with the trouble ticket.

The system provides an interface or front-end for interacting with the performance metrics in a variety of different ways. For example, when a customer calls in to a care center to inquire about their cellular service, a care representative can request that the system determine and/or present the metrics associated with the cell site proximate to the customer's home, the cell site proximate to the customer's workplace, and/or a plurality of cell sites in a geographical area that the customer most commonly inhabits. In an embodiment, the subject cell sites may be presented in a map view that features the different radio sectors of the cell sites. The map view may promote rapidly identifying a cell sector failure as a culprit in a sudden degradation of the wireless communication experienced by a customer. The map view may promote rapidly identifying a cell site failure and/or a plurality of cell site failures near and/or at a particular geographic area and/or geographic location as a culprit in a future degradation of the wireless communication to be experienced by a customer based on a history of performance metrics associated with the cell site and/or plurality of cell sites failures near and/or at the particular geographic area and/or geographic location. The map view may promote easy retrieval and discovering that a trouble ticket has been opened on the failed radio sector, and that a work order has been issued to replace failed radio sector equipment within the day. Because the customer care representative is easily able to retrieve and see trouble tickets associated to network resources, duplication of trouble tickets or opening of duplicate trouble tickets may be avoided.

The front-end of the system promotes a user inputting a metrics performance range and/or threshold and determining when the metrics of a particular cell site and/or a plurality of cell sites at and/or near a geographic area and/or geographic location were outside the range and/or crossed the threshold. The front-end of the system promotes a user inputting a time period (e.g. a date, a beginning date and end date, time of day, a beginning time and end time, and/or the like) and/or an event (e.g. environmental event, a sports event, or a public event), and determining the value(s) of metrics of a particular cell site and/or a plurality of cell sites at and/or near a geographic area and/or geographic location within the same time period and/or during the same event. It should be understood that the time period and/or the event may comprise a time before the time that the user performs the inputting into the front end system. This function may be referred to as a slider or a slider function.

This slider function promotes making apples-to-apples type of comparisons or seeing how different cell sites and/or different markets perform under stressed and/or loaded conditions. For example, a user may wish to identify about 10% of cell towers to focus troubleshooting efforts on. The user may modulate or adjust one or more slider functions to eliminate all but about 10% of the cell towers. For example, the user may modulate a slider that sets a voice call block rate threshold until 10% of cell towers in a metropolitan area are identified or in a national area are identified. The identified cell towers may be assigned to engineers for analyzing and adjusting the operating parameters of those cell towers. Alternatively, those cell towers may be identified for other corrective or remedial procedures, such as replacing the cell tower with new equipment or upgrading from an earlier generation wireless protocol to a later generation wireless protocol (e.g., updating from a 3G wireless technology to a 4G wireless technology). Alternatively, those cell towers may be identified for replacement or supplementation by multiple towers to better serve a customer base that has changes its usage patterns over time.

Figure 1:
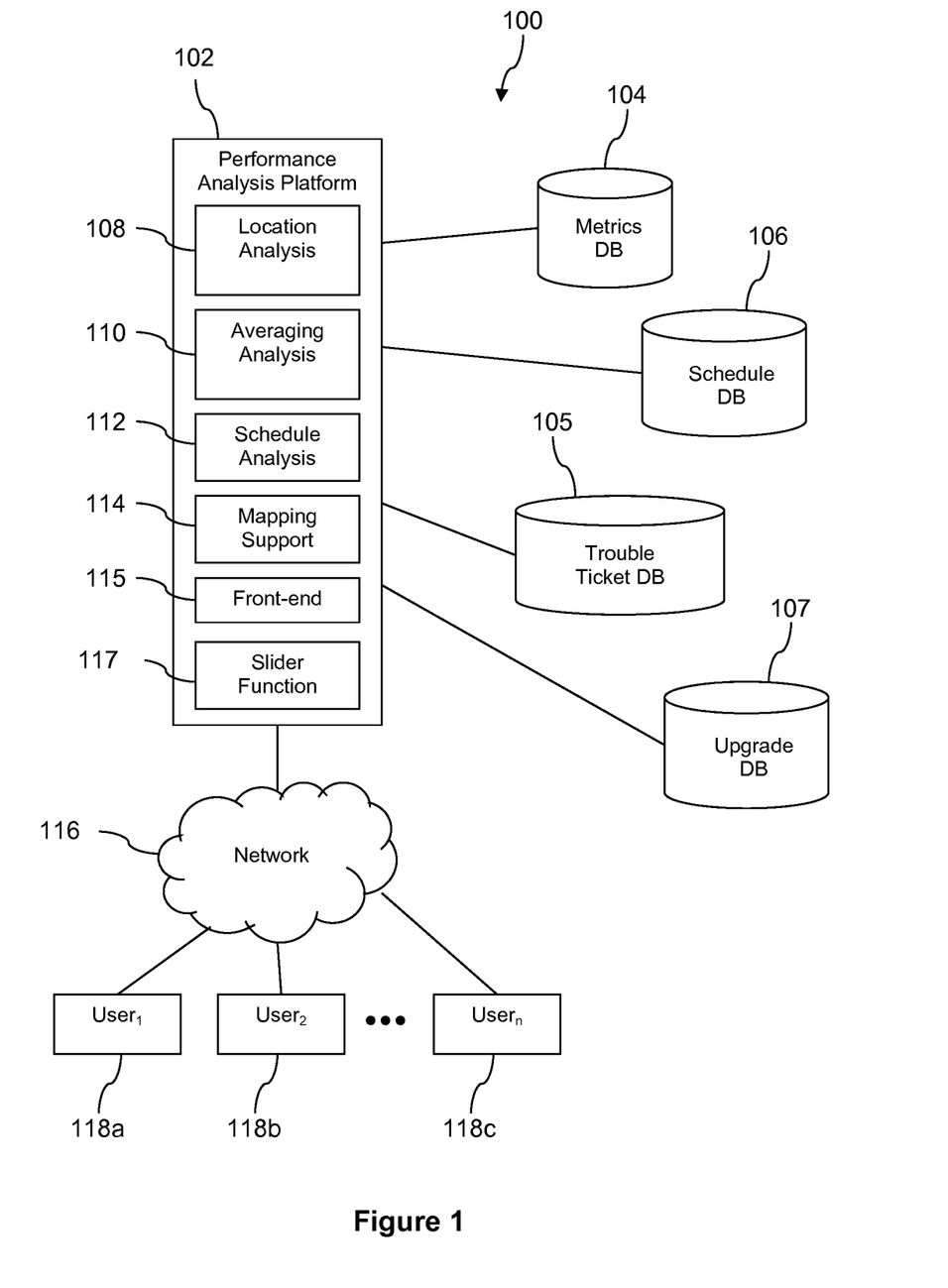
FIG. 1 is a block diagram of a system according to an embodiment of the disclosure.

Turning now to FIG. 1, a system 100 is described. In an embodiment, system 100 comprises a performance analysis platform 102, a metrics data store 104, a trouble ticket data store 105, a schedule data store 106, and an upgrade data store 107. The performance analysis platform 102 may be a computer system that executes one or more applications for cellular network communication performance metrics. In an embodiment, the performance analysis platform 102 may execute an in near real time location analysis component 108, an averaging metrics analysis component 110, a schedule analysis component 112, a mapping support component 114, a front-end 115, and/or a slider function component 117. One skilled in the art will appreciate that the functionality provided by the components 108, 110, 112, 114, 115, 117 may be combined into fewer components or partitioned among more components. Additionally, it is understood that the performance analysis platform 102 may support a plurality of slider function components 117 concurrently.

The system 100 further comprises a network 116 and a plurality of users 118. The network 116 comprises one or more private networks, one or more public networks, or a combination thereof. While the data stores 104, 105, 106, 107 are illustrated in FIG. 1 as directly coupled to the performance analysis platform 102, it is understood that the data stores 104, 105, 106, 107 may be coupled to the analysis platform 102 via the network 116.

The users 118 interact with the performance analysis platform 102 via the front-end 115. The users 118 may be computers such as personal computers, laptop computers, notebook computers, tablet computers, or other computers. The users 118 may represent web interfaces provided by the front-end 115 and accessed from computers, for example from web browsers executing on workstations, desktop computers, laptop computers, tablet computers, and the like. Different users 118 may be accorded different levels of access to the performance analysis functionality and/or performance metrics by the performance analysis platform 102, the slider function 117, and/or the front-end 115 based on a user class, as described more fully below. Computers are discussed in more detail hereinafter.

The performance analysis platform 102 may be employed to analyze and visualize the performance of one or more cell sites of a cellular wireless communication network at a variety of different levels of granularity, for example by using the front-end 115 of the performance analysis platform 102. The cellular wireless communication network may comprise a large number of cell sites and/or base transceiver stations, for example more than 20,000 cell sites or more than 50,000 cell sites. The cellular wireless communication network may further comprise wired network resources such as mobile switches, home location register (HLR) servers, visitor location register (VLR) servers, media gateways, and other network nodes in a wired network that provide the network infrastructure to connect the mobile devices of subscribers to other mobile devices, other telephones, or to the Internet. The cell sites may provide radio communication links to mobile devices using one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an iDEN wireless protocol.

The metrics data store 104 may comprise a variety of data and/or metrics on radio sectors of cell sites and/or cell sites. For example, data and/or metrics about voice call drops, voice call blocks, data call fails (failure to establish data call), data call drops, network faults, evolution data only (EV-DO) drops, EV-DO fails (failure to establish EV-DO call), and other cell site performance related metrics may be stored in the metrics data store 104. The data and/or metrics about voice call drops, voice call blocks, data call fails, data call drops, EV-DO drops, EV-DO fails, and other cell site performance related metrics may be provided by probes stationed near the cell sites to the data stores 104, 105, 106, and 107, for example daily, weekly, on some other periodic interval, and/or in near real time. In an embodiment, in near real time may comprise at most a 5 minute time lag between recording a metric at the cell sited and storing the recorded metric in the data store, at most a 10 minute time lag between recording a metric at the cell site and storing the recorded metric in the data store, at most a 30 minute time lag between recording a metric at the cell site and storing the recorded metric in the data store, at most a 60 minute time lag between recording a metric at the cell site and storing the recorded metric in the data store, at most a 90 minute time lag between recording a metric at the cell site and storing the recorded metric in the data store, at most a 120 minute time lag between recording a metric at the cell site and storing the recorded metric in the data store, at most a 150 minute time lag between recording a metric at the cell site and storing the recorded metric in the data store, at most a 180 minute time lag between recording a metric at the cell site and storing the recorded metric in the data store, and/or the like.

As known by one of ordinary skill in the art, a probe may be similar to a mobile phone and may attempt to originate calls. Unlike a mobile phone, the probe is operated automatically, collects metrics on blocks and drops, and provides this data back to the metrics data store 104 or other node in the service provider's network. Data collected from real mobile devices and data from probes may be distinguished and may promote presenting data associated with real mobile devices separately from data associated with probes.

The metrics data store 104 may comprise data and/or metrics about data communication activities and data and/or metrics about voice communication activities. The metrics data store 104 may comprise data and/or metrics about short message service (SMS) communication activities. The metrics data store 104 may comprise data about how many voice calls or data sessions are handled by a base transceiver station or cell tower during different units of time, for example numbers of calls or sessions per hour, per day, per week, and/or per other unit of time. The metrics data store 104 may receive data and/or metrics updates, for example count updates, and associate a date and/or a time with the received data and/or metrics updates. The date and/or the time may comprise the date and/or time that the data and/or metrics were recorded at the cell site(s) and/or the date and/or time that the data and/or metrics were received by the metrics data store 104.

In an embodiment, the metrics data store 104 may discard/delete data and/or metrics after a discard period of time and/or after the metric data store 104 reaches a predetermined storage capacity. For example, the metrics data store 104 may receive data and/or metrics updates at a periodic interval and for example, in near real time. Before, during, and/or after receiving the data and/or metrics updates, the metrics data store 104 may delete the earliest recorded and/or stored data and/or metrics stored in the metrics data store. The metrics data store 104 may discard/delete data and/or metrics after storing the data and/or metrics for 12 months, 11 months, 10 months, 9 months, 8 months, 7 months, 6 months, 5 months, 4 months, 3 months, 2 months, 1 month, 2 weeks, 1 week, and/or the like. In an embodiment, the metrics data store 104 may discard/delete the earliest recorded and/or stored data and/or metrics so that at least enough memory space exists in the metrics data store 104 to store the next set of recorded data and/or metrics from the cell sites throughout the cellular wireless communication network.

The metrics data store 104 may store both raw counts of voice call drops, voice call blocks, data call fails, data call drops, network faults, EV-DO fails, and EV-DO drops as well as performance metrics derived from or calculated based on the raw counts. The raw counts may be periodically processed to derive voice call drop rates, voice call block rates, data call fail rates, data call drop rates, EV-DO drop rates, EV-DO call failure rates, network fault alarm rates, and other rate based performance metrics. In an embodiment, the raw counts may be processed when an accumulation of unprocessed raw counts exceeds a predetermined threshold and/or when the raw counts are outside a calculated range. In an embodiment, the metrics may be determined at the cell sites and/or at a server in the wireless service provider network and written into the metrics data store 104 periodically, aperiodically, or in near real time. At least some of the rate based performance metrics may be determined as a percentage of opportunities, for example as a percentage of all calls attempted and/or as a percentage of all calls connected (e.g. on a per unit time basis) throughout the life of the cell site. The raw counts and the rate based performance metrics may be linked to or associated to a radio sector and/or cell site identity and/or geographic area identity.

In an embodiment, some rate based performance metrics may be determined by processing all counts accumulated over an hour, a day, a week, a month, or some other interval of time. Some counts may be processed to form per unit of time derived metrics for a plurality of different time units. For example, a raw data may be processed to derive each of a per hour count, a per day count, and a per week count. Some counts may be excluded from rate based performance metric calculations, for example counts accumulated on Mother's Day and/or holidays may be excluded as being non-representative of performance. Thus, there may be a single dropped voice call rate, a single blocked voice call rate, a single dropped data call rate, a single failed data call rate, a single failed EV-DO call rate, a single EV-DO dropped call rate, and a single network fault alarms rate associated with each radio sector of a cell site and/or cell site. In an embodiment, the rate based performance metrics may be determined based on counts that accumulate during a peak usage period of time, for example during a weekday busy hour.

In an embodiment, some rate based performance metrics may be determined for each of a plurality of different time periods. For example, a different blocked voice call rate may be determined for each of a morning period, an afternoon period, an evening period, and a late night period. For example, a blocked voice call rate may be determined for each hour of the day. In an embodiment, a blocked voice call rate may be determined for weekends and a separate blocked call rate may be determined for weekdays. The rate based performance metrics may be determined or calculated periodically over the most recent time window. Alternatively, the rate based performance metrics may be determined or calculated after a predefined number of counts accumulate.

The metrics data store 104 may contain information about cell site enhancements or capacity upgrades associated with the cell sites. The enhancements and/or capacity upgrades may be entered into the metrics data store 104 up to two years before the commissioning of the upgrades. In an embodiment, the information about cell site enhancements and/or capacity upgrades may be stored in another data store or accessed by the performance analysis platform 102 from another source. For example, the information about cell site enhancements, capacity upgrades, and other infrastructure improvements may be stored in the upgrade data store 107. Upgrades or enhancements may include capacity upgrades of a wired communication link between the cell site and a wired network, for example the public switched telephone network.

The metrics data store 104 may also receive events data in near real time and store the events while associating the events with the time the event occurred and location where the event occurred. In an embodiment, events may comprise environmental events, sports events, and/or public events. For example, the metrics data store 104 may collect environmental events data and may be in communication with an entity and/or organization that tracks the weather (e.g. the national weather service). The metrics data store 104 may have collected environmental event data in near real time from the national weather service that a tornado touched down in an area outside of Kansas City, Mo. on a particular date. The metrics data store 104 may store this environmental event data so that it may be correlated with metrics and/or data collected from cell sites near the same area outside of Kansas City, Mo. at the same date. The metrics data store 104 may collect sports events data and may be in communication with an entity and/or organization that tracks the spots events (e.g. the NFL, the NHL, the NBA, the MLB, and other sports organizations). The metrics data store 104 may have collected sports event data in near real time from the NFL that the Chicago Bears were playing the Green Bay Packers at Lambeau Field on a particular date. The metrics data store 104 may store this sports event data so that it may be correlated with metrics and/or data collected from cell sites near Lambeau Field on the same date.

The metrics data store 104 may collect public events data and may be in communication with an entity and/or organization that tracks the public events (e.g. a city government). The metrics data store 104 may have collected public event data in near real time from the City of New York that a public gathering in Times Square had taken place on New Year's Eve. The metrics data store 104 may store this public event data so that it may be correlated with metrics and/or data collected from cell sites near Times Square on New Year's Eve. In an embodiment, the information events may be stored in another data store or accessed by the performance analysis platform 102 from another source. For example, the information about environmental events, sporting events, and/or public events may be stored in the schedule data store 106.

The performance analysis platform 102 analyzes, processes, and summarizes a variety of information related to performance of the cell sites of a cellular wireless communication network. The performance analysis platform 102 promotes a range of analysis granularity to users 118 examining cellular site performance. The user 118 may enter a geographic area and/or a geographic location. The geographic area and/or geographic location may be entered by providing an address, zip code, and/or geographic coordinates. In an embodiment, the user 118 may identify the geographic area and/or geographic location by determining the location of particular mobile communication device using a location based technology (e.g. GPS, trilateration, and/or the like). The performance analysis platform 102 may identify at least one cell site nearest the geographic area and/or geographic location. In an embodiment, the performance analysis platform 102 may identify a plurality of cell sites nearest the geographic area and/or geographic location. For example, upon providing a geographic area and/or geographic location, the performance analysis platform 102 may identify the cell site nearest the geographic area and/or geographic location as well as five other cell sites nearer to the geographic area and/or geographic location than other cell site but not nearer than the cell site nearest the geographic area and/or geographic location. The system may identify a plurality of cell sites, for example, 2 cell sites, 3 cell sites, 4 cell sites, 5 cell sites, 6 cell sites, 7 cell sites, 8 cell sites, 9 cell sites, 10 cell sites, and/or more cell sites, nearest the geographic area and/or geographic location.

The user 118 may provide a predetermined time and/or predetermined time range of recorded data and/or metrics of the identified six cell sites that the user 118 wishes to compare with in near real time metrics (e.g. the data and/or metrics most recently recorded) at the same identified six cell sites. For example, a mobile device customer may call a user (e.g. a customer care representative) because the mobile device customer is experiencing poor cellular connectivity at his office while working on a Saturday. The mobile device customer may provide the address of his office to the user so that the user may enter the address into the performance analysis platform 102. The performance analysis platform 102 may identify six cell sites nearest the location of the office. The user may also wish to look at the data and/or metrics of the six identified cell sites during the previous week (e.g. Monday through Friday).

The user may enter the time period of the previous week into the performance analysis platform 102. The performance analysis platform 102 may retrieve data and/or metrics from the metrics data store 104 recorded during the time period of the previous week for each of the six identified cell sites nearest the office and provide that data and/or metrics to the user. The performance analysis platform 102 may also retrieve the in near real time data and/or metrics from the metrics data store 104 and provide the in near real time data and/or metrics for each of the six identified cell sites so that the user may examine the data and/or metrics of each of the cells sites at about the same time that the mobile device customer is calling and/or experience the poor cellular connectivity at his office. The performance analysis platform 102 may build a presentation and/or a graphical display and provide and/or transmit the presentation and/or graphical display to the user illustrating the change in data and/or metrics values as a function of time throughout the previous week.

In an embodiment, the performance analysis platform 102 may analyze the data and/or metrics of each of the identified cell sites (e.g. six cell sites) recorded during the time period (e.g. the previous week, Monday through Friday) and compare the data and/or metrics associated with each identified cell sites during the time period with the in near real time data and/or metrics of each of the identified cell sites. Based on the data and/or metrics recorded during the time period for each of the cell sites, the performance analysis platform 102 may calculate a range of values which if the data and/or metrics values fall within that range of values, the cell site producing those data values and/or metrics values may be considered a normal and/or a properly functioning cell site.

However, if for example, the in near real time data values and/or metrics values retrieved by the performance analysis platform 102 (and/or the other data and/or metrics recorded within the time period and retrieved by the performance analysis platform 102) are outside that range of values, the cell site producing the in near real time data values and/or metrics values which are outside the range of values may be considered an abnormal and/or a not properly functioning cell site. It should be understood that while a range of values is disclosed above, alternatively and/or additionally, a threshold may be calculated based on the data and/or metrics recorded during the time period for each of the cell sites. A cell site may be considered abnormal and/or not functioning properly if in near real time data and/or metrics values recorded and retrieved by the performance analysis platform 102 are above or below the threshold.

In an embodiment, the performance analysis platform 102 may build a presentation identifying a value of at least one data and/or metric of at least one cell site of the cell site identified as being closest to the geographic area and/or geographic location. The presentation may be a part of the presentation and/or graphical display provided and/or transmitted to the user illustrating the change in data and/or metric values as a function of time. Using the presentation the user 118 may take a view of performance of a single cell site and/or each of the cell sites identified to be nearest to the geographic area and/or geographic location. The user 118 may compare the selected view to any other level of granularity to promote comparisons. The user 118 may view the data and or information provided by the performance analysis platform 102 at different levels of time granularity, for example to see metrics represented on a per hour of time basis, on a per day time basis, on a per week time basis or another time basis. The data may be displayed on a time line to the user and information in addition to metrics may also be presented aligned with the same time basis, for example events that may be recorded in the schedule data store 106 such as a major sporting event, environmental event, public event, and/or installation of upgrades to service.

In an embodiment, the performance analysis platform 102 may comprise a slider function 117. The slider function 117 may be configured by the user to filter cell sites and/or select cell sites based on whether one or more performance metric associated with the cell sites are above or below a threshold. The slider function 117 further provides a control by that the user may vary the value of the threshold. For example, a slider function 117 may be configured by a user to select all cell sites that have a call block rate above a threshold. The slider function 117 may allow the user to vary the threshold from a 0% call block rate to a 100% call block rate. As the user varies the threshold of call block rate to a higher and higher rate, fewer cell sites are selected. Selected cell sites may be displayed on or superimposed over a map, for example a map of the United States. Other metrics may be selected to configure a slider function 117. Additionally, a slider function 117 may be configured that selects cell sites based on two or more performance metric thresholds, and the user may individually control the threshold of each of the performance metrics. In an embodiment, a slider function 117 may be configured that includes controlling a minimum number of call attempts, whereby cell towers in remote and/or low use areas may be excluded from consideration. In an embodiment, two or more slider functions 117 may be configured for concurrent use in adjusting two or more performance metric thresholds independently.

The location analysis component 108 may determine a summary performance metric for each of a plurality of cell sites nearest a selected geographic area and/or geographic location. The summary performance metric may be determined based on averages of the different cell site performance metrics over a predetermined time period, for example an average of the call drop rate, an average of the call block rate, an average of the EV-DO drop rate, and an average of the network fault rate across the cell sites of the subject market. It will be appreciated that this list is exemplary, and the summary performance metric may be based on additional metrics, for example a number of customer care calls associated with a market or a number of customer care calls per 1000 subscribers associated with a market. The summary metric may be based on a number of trouble tickets opened that are associated with a market, for example trouble tickets stored in the trouble ticket data store 105. The summary performance metric may take account of short message service lost or undelivered messages.

In an embodiment, the summary performance metric of each cell site within a selected geographic area and/or geographic location may be determined as a weighted sum of the several averages. For example, the summary performance metric may be determined by multiplying each of the averages by a separate weighting or coefficient and then summing these products. The metrics associated with some of the cell sites of a market may be excluded from the calculation of a summary performance metric for a market because the subject cell sites may be considered unrepresentative in some way. For example, the cell site may not have been in service long enough to be fully adjusted. For example, the cell site may have an anomalous loading pattern, for example lightly loaded except on Sunday mornings when church services are held in a large church within the coverage area of the subject cell site.

The location analysis component 108 may depend upon or invoke services provided by the performance metrics averaging component 110 to determine the averages of the cell site metrics identified as nearest to a selected geographic area and/or geographic location. The performance metrics averaging component 110 may depend upon or invoke services provided by the schedule analysis component 112 to exclude some atypical metrics from determination of averages. For example, the schedule analysis component 112, based on accessing the schedule data store 106, may indicate that a professional football game was played between noon and 3 PM on a particular Sunday, and the performance metrics averaging component 110 may use this information to exclude metrics associated with a cell site close to the football stadium between 8 AM and 6 PM from calculations of average performance metrics for the subject cell site. The schedule data store 106 may contain information on public events such as professional sports events, college sports events, graduation ceremonies, public fireworks displays, as well as other public events. The performance metrics averaging component 110 or another component of the performance analysis platform 102 may determine the rate based performance metrics of the cell sites.

The mapping support component 114 provides mapping functionality to promote presenting a map of the cellular wireless network at different levels of granularity. In an embodiment, the mapping support component 114 promotes viewing the complete cellular wireless network as a map overlaying a geographical map of the United States and zooming down to a series of finer degrees of granularity. For example, from a national level view that shows metrics or data associated with all cell sites the map may be zoomed to show data and/or metrics associated with cell sites near a selected geographic area and/or a selected geographic location at a more fine grained level of detail.

In an embodiment, other information may be presented with respect to cell sites near a selected geographic area and/or geographic location, for example statistics on numbers of subscribers, numbers of completed calls per month, average performance metrics, average performance metrics for the market expressed related to a national average of performance metrics, and/or other performance information. In an embodiment, users 118 may provide a geographic area and/or a geographic location to the mapping support component 114 so that the mapping support component may identify the one or more of the cell sites nearest the provided geographic area and/or geographic location. A user may provide an address, a zip code, or designate a point on a map provided by the mapping support component 114 so that the mapping support component 114 may identify the one or more of the cell sites nearest the provided geographic area and/or geographic location. In an embodiment, the mapping support component 114 may be given a mobile device identification number and/or a mobile device phone number and use the location of the mobile communication device as the provided geographic location.

The mapping support component 114 allows a user 118 to view the identified cell site(s) nearest the selected geographic area and/or geographic location. The performance metrics averaging tool 110 may then be invoked to determine performance metric averages over each of the identified cell sites based on recorded data and/or metrics during a selected time period for each cell site and relate these and/or compare these performance metric averages to the in near real time data and/or metrics (e.g. the data and/or metrics most recently recorded). The user 118 may designate an area and exclude some cell sites to approximate an area frequented by a customer, for example an area encompassing the customer's residence, the customer's workplace, and a commute path between residence and workplace. The mapping support component 114 may be used along with the performance metrics averaging component 110, for example invoked by the front-end component 115, to determine one or more average performance metrics for the customer and compare these average performance metrics with corresponding average performance metrics for the market and/or for the national average performance metrics.

The performance analysis platform 102 may comprise a slider function 117. The slider function 117 may allow a user to view how the performance metrics presented on a time line change over time, for example how the metrics change throughout a day or for example over a longer period of several months. The slider function 117 allows the user to vary some parameter related to the data, for example a timestamp of the data or a threshold value of a performance metric. The slider function 117 may allow a user 118 to view data and/or metric of a particular cell site within and/or outside a specified time period. The slider function 117 may allow a user to see events and/or event data, for example major events such as sporting events, fireworks displays, and the like, outside a provided time period. The slider function 117 may allow a user to see information about planned upgrades may be displayed associated with particular cell site. The slider function 117 may allow a user to see information about weather events which may have taken place near the location of a particular cell site. The slider function 117 allows a user to see a wealth of information about a particular cell site to promote a more holistic understanding of the performance metrics and what factors may be influencing those performance metrics. This information may be helpful to a customer care representative, for example, who is speaking to a customer about wireless service problems experienced by the customer.

The performance analysis platform 102 may be employed by the users 118 for a variety of use cases. A customer care agent or customer service representative may use the performance analysis platform 102 to obtain initial talking points to begin a discussion with a customer who calls in with a problem. Based on further discussions with the customer, the agent may use other functions of the performance analysis platform 102 to drill down to finer details and/or to compare experienced performance with a larger region.

A manager may use the performance analysis platform 102 to plan capital expenditures in support of a radio network performance improvement initiative. For example, the manager may use the slider function 117 to identify the 5 poorest performing cell sites in his region. The performance analysis platform 102 supports different ways of identifying "poorest" performing. For a first manager, poorest performance may be related to blocked voice call rates but for a second manager poorest performance may be related to dropped data call rates. The performance analysis platform 102 supports each manager using his or her own preferred definition of "poorest performance" to select cell towers. A manager may also use the performance analysis platform 102 to review performance, improvement, and benefit of capital expenditure by looking at performance of selected cell sites over time, for example comparing performance metrics from a time before completing hardware adjustments and/or maintenance and to performance metrics from after completing hardware adjustments and/or maintenance.

Figure 2A:
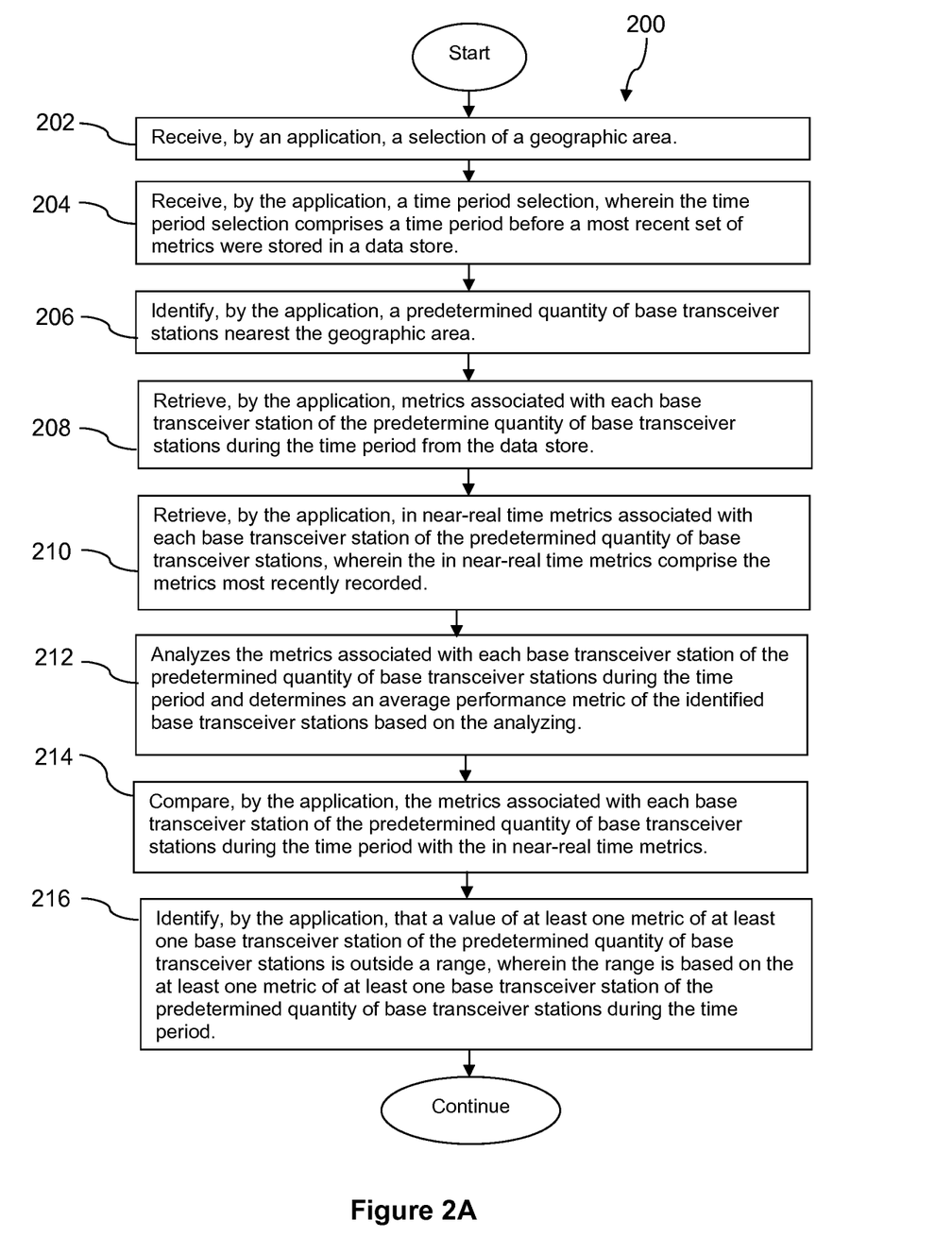
FIGS. 2A and 2B comprise a flow chart of a method according to an embodiment of the disclosure.
Figure 2B:
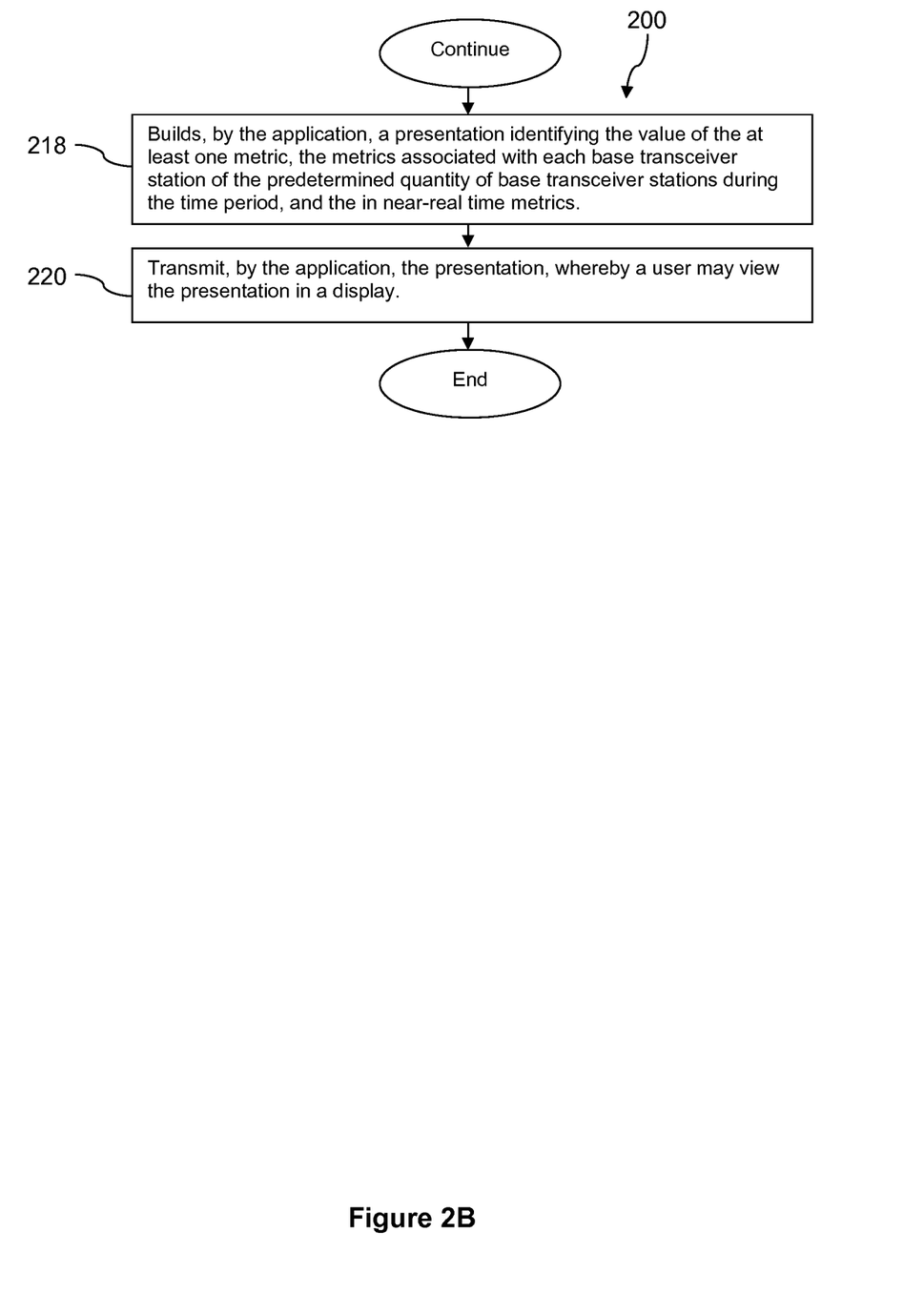

Turning now to FIGS. 2A and 2B, a method 200 is described. At block 202, receive, by an application, a selection of a geographic area. At block 204, the application receives a time period selection, wherein the time period selection comprises a time period before a most recent set of metrics were stored in a data store. At block 206, the application identifies a predetermined quantity of base transceiver stations nearest the geographic area. For example, identify 6 base transceiver stations nearest the geographical area. At block 208, the application retrieves metrics associated with each base transceiver station of the predetermined quantity of base transceiver stations during the time period from the data store. At block 210, the application retrieves in near real time metrics associated with each base transceiver station of the predetermined quantity of base transceiver stations, wherein the in near real time metrics comprise the metrics most recently recorded. At block 212, the application analyzes the metrics associated with each base transceiver station of the predetermined quantity of base transceiver stations during the time period and determines an average performance metric of the identified base transceiver stations based on the analyzing. At block 214, the application compares the metrics associated with each base transceiver station of the predetermined quantity of base transceiver stations during the time period with the in near real time metrics.

At block 216, the application identifies that a value of at least one metric of at least one base transceiver station of the predetermined quantity of base transceiver stations is outside a range, wherein the range is based on the at least one metric of at least one base transceiver station of the predetermined quantity of base transceiver stations during the time period. At block 218, the application builds a presentation identifying the value of the at least one metric, the metrics associated with each base transceiver station of the predetermined quantity of base transceiver stations during the time period, and the in near real time metrics. At block 220, the application transmits the presentation, whereby a user may view the presentation in a display. It will be appreciated that the user may use the presented information to make management decisions, for example to defer upgrading a first base transceiver station and advancing an upgrade of a second base transceiver station based on the information. In an embodiment, the user may be a customer care agent handling a call from a subscriber to a wireless communication service, and the agent may provide assistance to the subscriber based on the presentation. In an embodiment, at least a portion of the presentation may comprise "talking points" that may be used to provide assistance and/or information to the customer and/or subscriber.

In an embodiment, the performance metrics of the identified base transceiver stations may comprise statistics of short message service (SMS) communication. In an embodiment, the performance metrics of the identified base transceiver stations may comprise a blocked call rate and a dropped call rate. In an embodiment, in near real time comprises at most an hour delay from actual real time.

In an embodiment, the method may comprise retrieving at least one event from an event data store, wherein the at least one event is associated with at least a time within the time period or the time of the most recently recorded metrics based on the time of the event occurrence, wherein the at least one event is associated the geographic area based on the event geographic area, where the at least one event comprises at least one of an environmental event, a sports event, or a public event, and wherein the events are recorded in near real time and associated with a time of an event occurrence and an event geographic area. In an embodiment, the cellular wireless communication network may promote radio communication based on at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an iDEN wireless protocol.

In an embodiment, the application may receive a viewing selection to view at least one metrics value associated with at least one base transceiver station of the predetermined quantity of base transceiver stations of a selection time within the time period. In an embodiment, the application may update the presentation to display the at least one metrics value.

Figure 3:
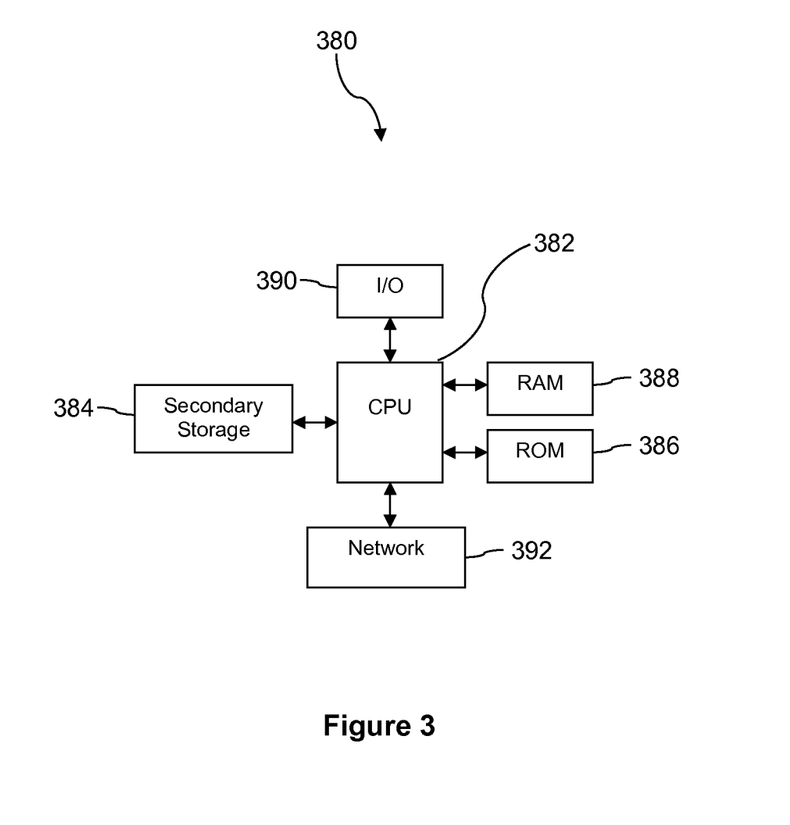
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), iDEN, and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for managing a cellular wireless communication network in near real time, comprising:
   a data store associated with cellular wireless communication performance, the data store comprising performance metrics stored in non-transitory memory, wherein the performance metrics in the data store are segmented according to base transceiver stations and the time the performance metrics were recorded, and wherein the performance metrics comprise at least two of: voice call block metrics, voice call drop metrics, data call set-up fail metrics, or data call drop metrics; and
   a server computer at a communication provider that is coupled to the data store, the server computer comprising:
      a processor communicatively coupled to a non-transitory memory, and
      an application stored in the non-transitory memory of the server computer that, upon execution by at least the processor, configures the server computer to:
         receive a selection of a geographic area that includes an area frequented within the cellular wireless communication network by a customer corresponding to a mobile communication device,
         receive a time period selection,
         identify a predetermined quantity of base transceiver stations that approximate the area frequented by the customer, wherein the predetermined quantity excludes at least some base transceiver stations nearest the geographic area,
         retrieve performance metrics corresponding to the time period selection and associated with each base transceiver station of the predetermined quantity of base transceiver stations from the data store, determine near real time metrics at each base transceiver station of the predetermined quantity of base transceiver stations, wherein the near real time metrics correspond to a time lag and comprise the metrics most recently recorded at the base transceiver station before being stored in the data store, generate performance metric averages corresponding to the time period selection and a range of normal performance for each base transceiver station of the predetermined quantity of base transceiver stations based on analysis of the performance metrics associated with each base transceiver station of the predetermined quantity of base transceiver stations, analyze and compare the near real time metrics corresponding to the time lag with the performance metric averages corresponding to the time period selection, determine that at least one base station transceiver is performing abnormally based on the analysis identifying that at least one of the determined near real time metrics associated with the at least one base transceiver station of the predetermined quantity of base transceiver stations is outside the range of normal performance, wherein being outside of the range of normal performance is based on a value of the at least one near real time metric exceeding a threshold associated with the range of normal performance during the time period selection, build a presentation that identifies the at least one base station transceiver that is performing abnormally, the value of the at least one near real time metric outside of the range of normal performance, the performance metrics associated with each base transceiver station of the predetermined quantity of base transceiver stations, and the near real time metrics, and transmit the presentation to a display and initiate an action comprising opening and assigning a network trouble ticket for the at least one base station transceiver that is performing abnormally a display.

2. The system of claim 1, further comprising an events data store coupled to the server computer and having non-transitory memory that stores events comprising at least one of an environmental event, a sports event, or a public event, wherein the events are recorded in near real time and associated with a time of an event occurrence and an event geographic area.

3. The system of claim 2, wherein the server computer is configured by the application to retrieve the at least one event, wherein the at least one event is associated with at least a time within the time selection or the time of the most recently recorded metrics based on the time of the event occurrence, and wherein the at least one event is associated with the geographic area based on the event geographic area.

4. The system of claim 3, wherein the server computer is configured by the application to build the presentation based on the time the performance metrics were recorded and the time of the event occurrence.

5. The system of claim 3, wherein the server computer is configured by the application to identify the at least one event in the presentation, and associate the at least one event with the recorded near real time metric in the presentation based on the time of the event occurrence.

6. The system of claim 1, wherein the performance metrics comprise call drop rates, call block rates, evolution data only (EV-DO) failure rates, and network fault alarms.

7. The system of claim 6, wherein the call drop rates and the call block rates are represented as a percentage relative to call attempts.

8. The system of claim 6, wherein the network fault alarms are stored in the cellular wireless communication performance data store as a number of network fault alarms per thousand subscribers.

9. A method of managing a cellular wireless communication network in near real time, comprising:

receiving, by executing an application stored in non-transitory memory that configures a processor of a server at a communication service provider, a selection of a geographic area that includes an area frequented within the cellular wireless communication network by a customer corresponding to a mobile communication device;

receiving, by the server configured by executing the application, a time period selection;

identifying, by the server configured by executing the application, a predetermined quantity of base transceiver stations that approximate the area frequented by the customer, wherein the predetermined quantity excludes at least some base transceiver stations nearest the geographic area;

retrieving, by the server configured by executing the application, performance metrics corresponding to the time period selection and associated with each base transceiver station of the predetermined quantity of base transceiver stations from a data store remote from each base transceiver station;

determining, by the server configured by executing the application, near real time metrics at each base transceiver station of the predetermined quantity of base transceiver stations, wherein the near real time metrics correspond to a time lag and comprise metrics most recently recorded at the base transceiver station before being stored in the data store;

generating performance metric averages corresponding to the time period selection and a range of normal performance for each base transceiver station of the predetermined quantity of base transceiver stations based on analysis of the performance metrics associated with each base transceiver station of the predetermined quantity of base transceiver stations;

analyzing and comparing, by the server configured by executing the application, the near real time metrics corresponding to the time lag with the performance metric averages corresponding to the time period selection;

determining, by the server configured by executing the application, that at least one base station transceiver is performing abnormally based on the analysis identifying that at least one of the determined near real time metrics associated with the at least one base transceiver station of the predetermined quantity of base transceiver stations is outside the range of normal performance, wherein being outside the range of normal performance is based on a value of the at least one near real time metric exceeding a threshold associated with the range of normal performance during the time period selection;

building, by the server configured by executing the application, a presentation that identifies the at least one base station transceiver that is performing abnormally, the value of the at least one near real time metric outside the range of normal performance, the performance metrics associated with each base transceiver station of the predetermined quantity of base transceiver stations, and the near real time metrics; and transmitting, by the server configured by executing the application, the presentation to a display and initiating an action comprising opening and assigning a network trouble ticket for the at least one base station transceiver that is performing abnormally, whereby a customer care agent may view the presentation in the display and provide assistance to a wireless communication service subscriber based on the presentation.

10. The method of claim 9, wherein the performance metrics of the base transceiver stations comprise statistics of short message service (SMS) communication.

11. The method of claim 9, wherein the performance metrics of the base transceiver stations comprise a blocked call rate and a dropped call rate.

12. The method of claim 9, wherein the at least one near real time metric corresponds with the time lag that is at most an hour delay from actual real time.

13. The method of claim 9, further comprising:
retrieving, by the server configured by executing the application, at least one event from non-transitory memory of an event data store coupled to the server,
wherein the at least one event is associated with an event geographic area and at least a time within the time selection or the time of the most recently recorded metrics at the base transceiver station before being stored in the data store based on the time of the event occurrence,
wherein the at least one event is associated with the geographic area based on the event geographic area,
wherein the at least one event comprises at least one of an environmental event, a sports event, or a public event, and
wherein the at least one event corresponds to the time lag and is associated with the time of the event occurrence and the event geographic area.

14. The method of claim 9, wherein the cellular wireless communication network is based on at least one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or an iDEN wireless protocol.

15. A system for managing a cellular wireless communication network in near real time, comprising:
a data store associated with cellular wireless communication performance, the data store comprising performance metrics stored in non-transitory memory, wherein the performance metrics are segmented according to base transceiver stations and the time the performance metrics were recorded; and
a server computer at a communication provider that is coupled to the data store, the server computer comprising:
a processor communicatively coupled to a non-transitory memory, and
an application stored in the non-transitory memory that, upon execution by at least the processor, configures the server computer to:
receive a selection of a geographic area that includes an area frequented within the cellular wireless communication network by a customer corresponding to a mobile communication device,
receive a time period selection,
identify a predetermined quantity of base transceiver stations that approximate the area frequented by the customer, wherein the predetermined quantity excludes at least some base transceiver stations nearest the geographic area,
retrieve performance metrics corresponding to the time period selection and associated with each base transceiver station of the predetermined quantity of base transceiver stations from the data store,
determine near real time metrics at each base transceiver station of the predetermined quantity of base transceiver stations, wherein the near real time metrics correspond to a time lag and comprise metrics most recently recorded at the base transceiver station before being stored in the data store,
generate performance metric averages and a range of normal performance for each base transceiver station of the predetermined quantity of base transceiver stations corresponding to the time period selection and based on analysis of the performance metrics associated with each base transceiver station of the predetermined quantity of base transceiver stations,
analyze and compare the near real time metrics corresponding to the time lag with the performance metric averages corresponding to the time period selection,
determine that at least one base station transceiver is performing abnormally based on the analysis identifying that at least one of the near real time metrics associated with the at least one base transceiver station of the predetermined quantity of base transceiver stations is outside the range of normal performance, wherein being outside the range of normal performance is based on a value of the at least one near real time metric exceeding a threshold associated with the range of normal performance during the time period selection,
build a presentation that identifies the at least one base station transceiver that is performing abnormally, the value of the at least one near real time metric that is outside the range of normal performance, the performance metrics associated with each base transceiver station of the predetermined quantity of base transceiver stations, and the near real time metrics,
transmit the presentation to a display, wherein an allocation is made to repair of the at least one base transceiver station based on the presentation in the display,
receive a viewing selection corresponding to at least one metrics value associated with at least one base transceiver station of the predetermined quantity of base transceiver stations of a selection time within the time selection, and
update the presentation to display the at least one metrics value based on the viewing selection.

16. The system of claim 15, further comprising an events data store coupled to the server computer and having non-transitory memory that stores events, wherein the events comprise at least one of an environmental event, a sports event, or a public event, wherein the events are recorded in near real time and associated with a time of an event occurrence and an event geographic area corresponding to the cellular wireless communication network.

17. The system of claim 16, wherein the server computer is configured by the application to retrieve the at least one event, wherein the at least one event is associated with at least a time within the time selection or the time of the most recently recorded metrics based on the time of the event occurrence, and wherein the at least one event is associated with the geographic area based on the event geographic area.

18. The system of claim 17, wherein the server computer is configured by the application to build the presentation identifying the at least one event and associating the at least one event with the recorded metrics based on the time the performance metrics were recorded and the time of the event occurrence.

19. The system of claim 17, wherein the server computer is configured by the application to build the presentation identifying the at least one event and associating the at least one event with the recorded near real time metrics based on the time of the event occurrence.

20. The system of claim 15, wherein based on the presentation, the server computer is configured by the application to allocate a parameter associated with a budget for the at least one base transceiver station, assign a trouble ticket in a trouble ticket data store to the at least one base transceiver station, or generate a script of talking points that is displayed on a computer.

\* \* \* \* \*